Nov. 25, 1952 J. A. H. COLEMAN 2,618,859
ADJUSTABLE SQUARE
Filed Sept. 28, 1950
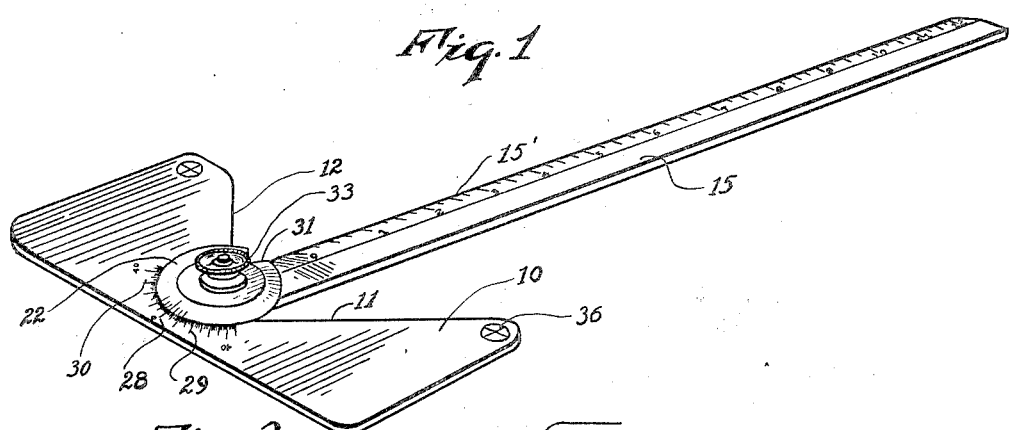
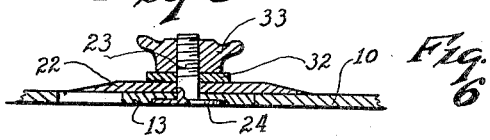
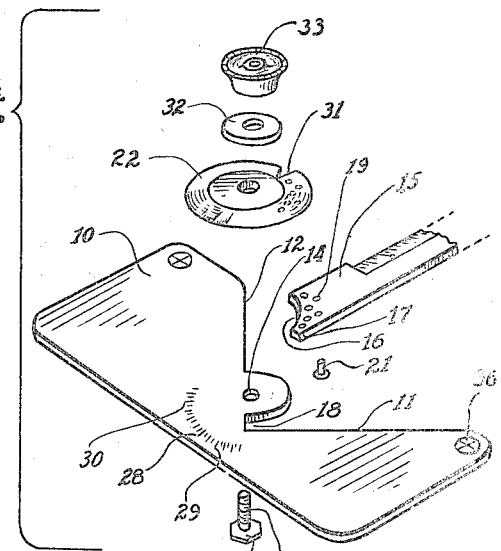
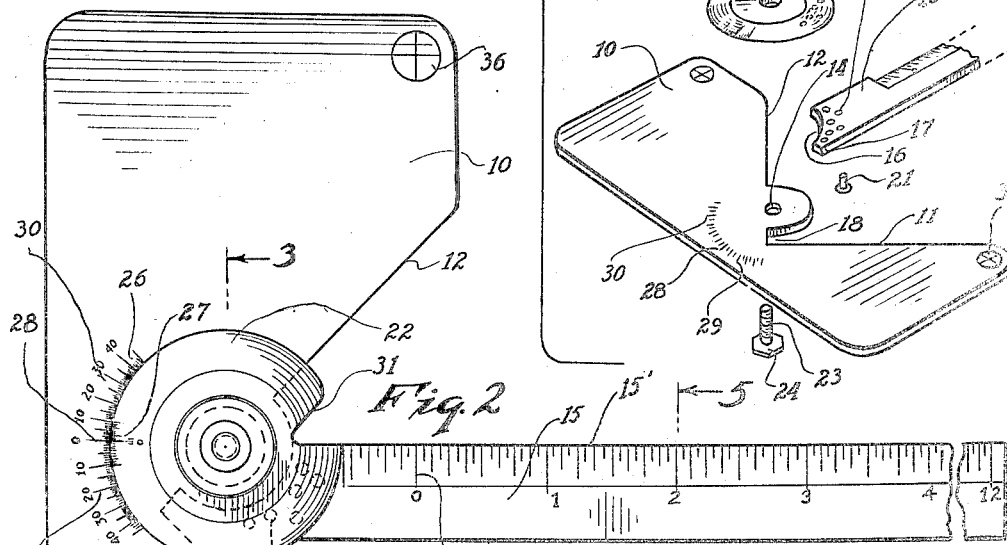
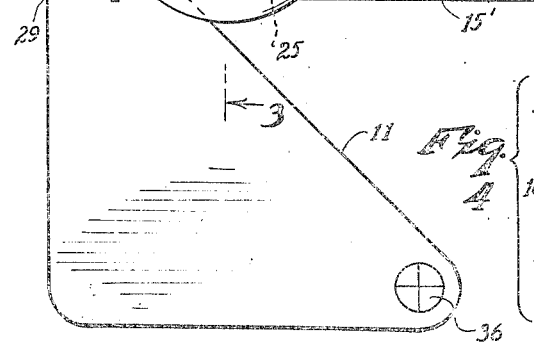
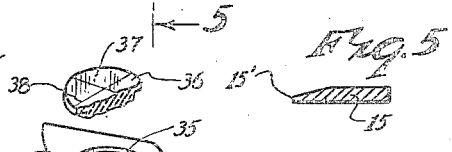
INVENTOR.
J. A. HURTHEL COLEMAN
BY
L. S. Saulsbury
ATTORNEY Patented Nov. 25, 1952

2,618,859

UNITED STATES PATENT OFFICE 2,618,859

ADJUSTABLE SQUARE

John Allen Hurthel Coleman, Hatboro, Pa.

Application September 28, 1950, Serial No. 187,203

2 Claims. (Cl. 33—93)

This invention relates to a gauge square or the like.

It is an object of the present invention to provide an adjustable square for drawing work wherein different angled lines can be drawn by a simple adjustment of the scale arm and by clamping the same in the adjusted position for the desired angle.

It is another object of the present invention to provide a square in which the main piece to which the scale arm is attached for adjustment can be readily aligned with a vertical line on the drafting board or table and wherein the main body has a cut away edge forming the space in which the scale arm may turn and protruding from one side of the angle cut opening is a rounded projection with which a rounded cut in the end of the scale cooperates and wherein the scale can be turned through an angle of ninety degrees and forty-five degrees on each side of a horizontal line.

Other objects of the present invention are to provide a gauge square or the like which is of simple construction, inexpensive to manufacture, easy to manipulate, has a minimum number of parts, compact and efficient in operation.

For other objects and for a better understanding of the invention, reference may be had to the following detailed description taken in connection with the accompanying drawing, in which Fig. 1 is a perspective view of the instrument embodying the features of the present invention.

Fig. 2 is a fragmentary top plan view of the instrument.

Fig. 3 is a vertical sectional view taken generally on line 3—3 of Fig. 3 and of the adjustable connection of the scale arm with the main body.

Fig. 4 is a fragmentary perspective view of the transparent hair line elements and of the opening in the main body for receiving the same.

Fig. 5 is a transverse sectional view taken on line 5—5 of Fig. 2.

Fig. 6 is a collective and perspective view of the adjustable connection parts.

Referring now to the figures, 10 represents a main plate which has cut in one edge an angle opening with sides 11 and 12 disposed at an angle of ninety degrees with respect to each other and on one of the sides is a rounded projection 13 spaced from the apex of the two sides and having a central hole 14 through which the adjustable connection parts extend.

A scale arm 15 has a curved cut 16 in one end adapted to conform to the peripheral edge of the projection 13 in order that the scale arm will be guided thereover as it is turned from one angle to the other. The cut away on the end of the scale arm is at one corner thereof and the side end, as indicated at 17, can extend into apex 18 of the sides 11 and 12 of the main body or plate 10.

Also in the end of the scale arm 15 are a plurality of holes 19 for receiving a connecting rivet 21 which will project upwardly into a notched disc 22 carried on a threaded screw post 23 having flanged head 24 which is confined in a recess in the bottom face of the projection 13, Fig. 3. This connection of the rivet with the disc 22 is made by the extension of the rivet into holes, any one of which will retain the arm 15 in a preset position. These holes are indicated at 25. On the disc is a zero indication 26 and a vernier scale 27. On the plate 10 is a zero indication 28 and graduated scales 29 and 30 giving the angular locations for the scale arm. The scale arm 15 has an edge 15' which will be aligned with the center of the post 23 when the scale arm is fixed to the disc 22.

The disc 28 has a notch 31 with one side running coextensively with the side edge 15' of the scale 15. On the screw post 23 is a washer 32 which is held on the top face of the disc 22 by a hand tightening nut 33. When the angle of the scale arm has been set, the nut 33 is tightened and the scale arm will be held in its adjusted position.

At each of the two inner corners of the plate 10 is an opening 35 in which is fitted a transparent hair line disc 36 having hair lines 37 and 38 crossing with one another. The hair lines are aligned at their centers so that upon placing the plate 10 on a vertical line, the scale arm 15 will be adjusted relative to the same.

When the edges of the scale arm 15 abut with the sides of the cut away edge of the plate 10, the scale arm will be held against further adjustment. These sides permit an angular adjustment of ninety degrees.

Zero indication 15" is aligned with the cross hairs of the aligning elements 36. The arm will turn the disc 22 and both will be held in place as the thumb nut 33 is tightened. The readings can be had on the plate 10 so that the amount of angular adjustment which has been effected relative to a horizontal line or zero reading can be readily determined. The vernier scale can give fractional degrees.

While various changes may be made in the detail construction, it shall be understood that such changes shall be within the spirit and scope of the present invention as defined by the appended claims.

What is claimed is:

1. An adjustable square comprising a plate having an angle cut in one edge of the same providing two angle sides angled relative to each other, a projection on one of the sides having a rounded periphery, a scale arm having one end cut away at one side thereof and providing a rounded edge slidable over the rounded periphery of the projection, scale disc means connected to the scale arm and overlying the projection and means for connecting the scale disc means to the plate for pivotal adjustment of the rounded edge of the scale arm over the rounded periphery of the projection, said angle sides of the angle cut forming an apex inwardly of the projection on one side thereof, and the scale arm being provided with side edges adapted to engage with the angled edges of the angle cut of the plate whereby said angle edges limit the adjusting movement of the scale arm, the inner end of the scale arm entering the apex of the angle cut when lying against the side thereof opposite to the projection.

2. An adjustable square comprising a plate having an angle cut in one edge of the same providing two angle sides angled relative to each other, a projection on one of the sides having a rounded periphery, a scale arm having one end cut away at one side thereof and providing a rounded edge slidable over the rounded periphery of the projection, a pivot post extending upwardly through the projection, a disc turnable on the pivot post, means securing together the end of the scale arm with the under side of the disc, a turn nut adjustable on the post for making secure the disc and the scale arm upon the main plate and in their angularly adjusted positions, and said angle sides of the angle cut forming an apex inwardly of the projection on one side and the scale arm being provided with side edges adapted to engage with the angled edges of the cut whereby said angle edges limit the adjusting movement of the scale arm, the inner end of the scale arm entering the apex of the angle cut when lying against the side thereof opposite to the projection.

JOHN ALLEN HURTHEL COLEMAN.

REFERENCES CITED

The following references are of record in the file of this patent:

UNITED STATES PATENTS

| Number | Name | Date |
| --- | --- | --- |
| 512,199 | Love | Jan. 2, 1894 |
| 658,262 | Hester | Sept. 18, 1900 |
| 1,416,652 | Laubenheimer | May 16, 1922 |
| 2,321,862 | Savage | June 15, 1943 |

FOREIGN PATENTS

| Number | Country | Date |
| --- | --- | --- |
| 384,040 | Germany | Mar. 27, 1923 |